Patented Apr. 19, 1927.

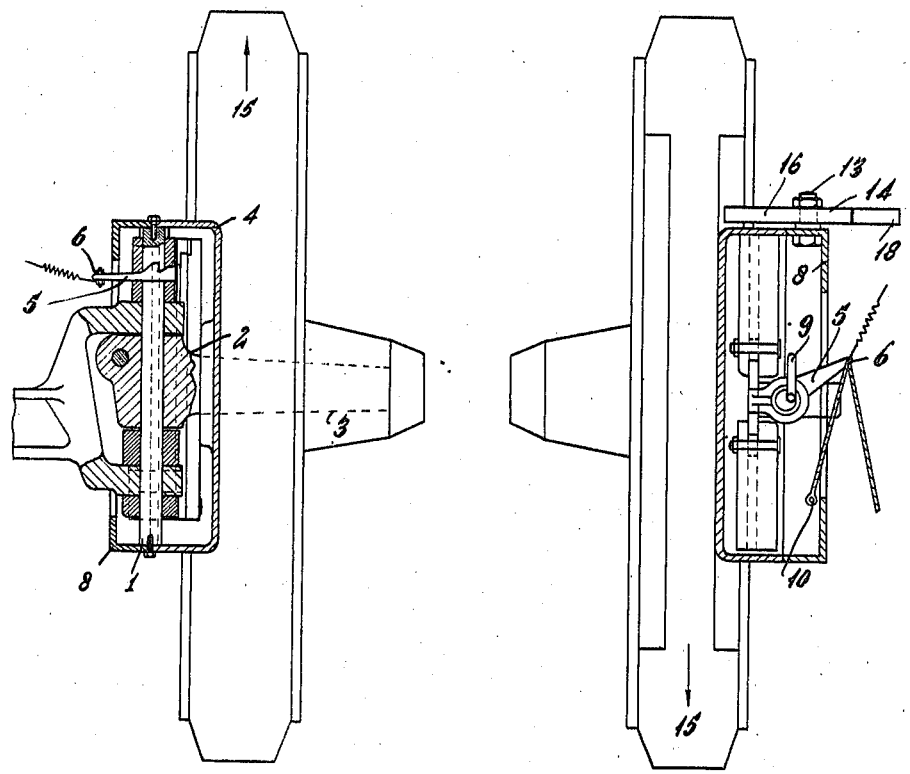

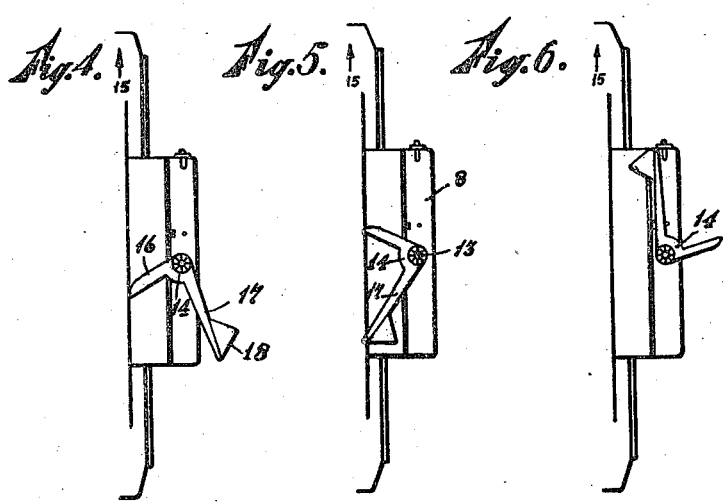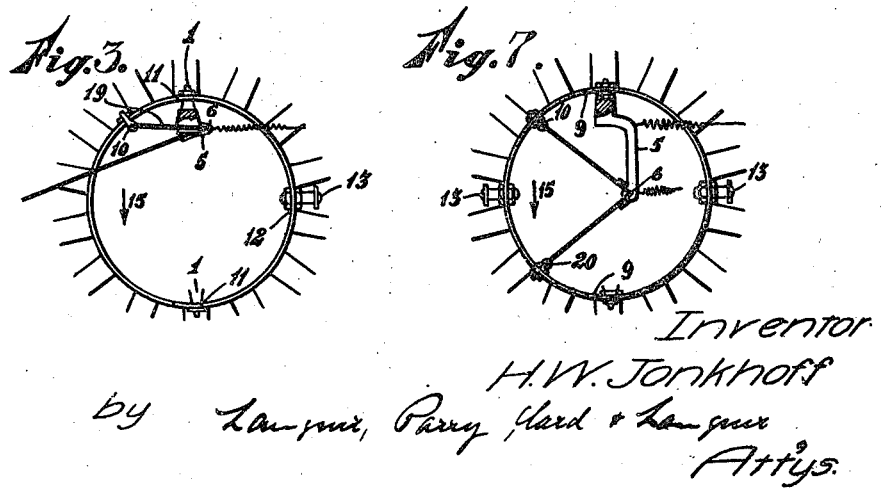

1,625,727

UNITED STATES PATENT OFFICE.

HENRI WOUTER JONKHOFF, OF SEMARANG, JAVA, DUTCH EAST INDIES.

BRAKE DEVICE.

Application filed April 8, 1924, Serial No. 705,116, and in the Netherlands March 21, 1922.

This invention has reference to braking arrangements for vehicles which can be automatically put into operation by the movement of the vehicle in a pre-determined direction, as for example when it commences to run backwards down an incline. In this connection, with freight cars and tractor trains having trailers as used in mountainous countries there is a need for a wheel brake coming automatically into operation as soon as the vehicle begins to run back. Almost daily accidents occur which are often caused by the fact that the driver does not act immediately, and this, coupled with the time occupied by the take-up of the brakes (adapted to exert a gradually increasing brake-force), is dangerous in critical moments. On steep inclines, where the shortest delay is almost immediately followed by a running back, forces at once come into action which cannot be overcome even by the maximum brake-force.

The invention has for its object to provide means for avoiding the said drawback. According to the invention the existing wheel brakes are combined with an automatically acting device, which is preferably capable of being rendered operative or inoperative at will. This automatic action is derived from the backward wheel motion of the vehicle in such a manner that the full brake capacity is at once attained as soon as a wheel has run back but a few inches. This rapid action prevents the vehicle obtaining momentum, and on the other hand when it has again started forward only a few inches the brake-action ceases immediately. It is remarked in this instance that the invention should not be confused with known devices including pawl-brakes. In a pawl-brake the entire braking resistance is concentrated upon the pawl shaft or spindle and the recess in which the pawl engages and such a construction, especially as it comes into operation suddenly, is easily liable to distortion and fracture.

In the construction according to the present invention although use is made of a device comparable to a pawl, this pawl has only a secondary function and does not necessarily receive the forces developed by the running back vehicle, as this function is performed by the brake segments of the usual brake in the brake drum. Moreover, according to the invention the gradual brake-action is also obtained as distinct from the jarring of a pawl-brake, and the existing brakes are put on more strongly. Therefore with a device according to the invention the mechanism is not liable to be forced or jarred out of action and even after repeated use the device acts equally well.

The invention consists, broadly speaking, of a device provided for vehicle wheels having the usual brakes, which device comprises means capable of coming into operation automatically for applying the brakes by a rotation of the wheel in a predetermined direction.

The invention will be more fully understood with reference to the accompanying drawings in which—

Figure 1 is a vertical section of a vehicle wheel provided with the device according to the invention.

Fig. 2 is a plan view thereof.

Fig. 3 is a side elevation of the auxiliary brake drum.

Figs. 4 and 5 are side elevations of a vehicle wheel rotating in forward and in rearward directions, respectively.

Fig. 6 shows in side elevation a wheel with the brake device in inoperative position.

Fig. 7 shows in side elevation an embodiment with a double acting brake device.

Figs. 1–3 show a brake construction according to the invention.

Upon the ends of the vertical axle 1 of the steering swivel 2 a second brake-drum 8 is attached adjacent to the usual existing drum 4 so that the drum 8 is forced to perform all the steering movements of the wheel turning about the same vertical axis.

The second brake-drum 8 is rotatable in a limited degree about its imaginary horizontal axis by reason of the fact that the vertical axle 1 of the steering swivel 2 projects at both ends through slots 9 formed in the brake-drum and having a length of about 3 to 4 inches. The partial rotation of the drum 8 is caused on the operation of means provided to this end as is explained later.

This second brake drum 8 is connected at the inner side (Figure 1) at 10 to point 6 of the spring-lever 5 operation of which, in one direction, results in applying two brake segments against the inner side of the usual brake drum 4, so that the drum will always be pressed with the slot ends 11 against the vertical axle 1. At another point 12 at the outer side of this drum a horizontal pivot 13 is arranged about which a bell-crank lever 14 of the shape shown in Figure 4 is rotatable. When the wheel moves forwardly opposite to the direction of the arrow 15 the vertical arm 16 of the bell-crank lever will slide along the spokes of the wheel and the said arm will then be pressed down. The longer horizontal arm tends always to move upwards which will occur as soon as the wheel rotates in an opposite direction, i. e. in this case backwardly. As soon as this occurs the bell-crank lever 14 will rotate about its horizontal pivot 13 and the other arm 17 will then also enter between the spokes so that the bell-crank lever will perform the function of a pawl and through the pivot 13 will carry the brake-drum 8 in the direction of the backward rotation of the wheel.

As a result the point 10 inside the said drum would be moved away from the point 6 of the spring lever 5 if it were not connected thereto by a cable 19 or another connection. The result therefore will be that the lever 5 is shifted simultaneously with the displacement of the bell-crank lever 14 by the wheel spokes, and the usual brake will at once perform its function with rapidly increasing force, and stops rotation of the wheel before part 1 reaches the end of its slot 9, it being understood that this slot is dimensioned to permit such action.

Now when the vehicle is started forward again release will immediately occur by reason of the lever 5 moving back under the influence of its spring, so that after a forward motion of but a few inches the brakes will be entirely free. Simultaneously the second brake-drum 8 will return into its original position by the pull exerted on the connection 19. The horizontal stud 13 also returns to its original position, while the vertical arm 16 of the bell crank lever 14 will be pressed down by the opposite rotation of the spokes.

It will be clear that a construction of this kind may be applied to any wheel which is provided in the usual way with a brake. In this embodiment a steerable wheel has been chosen for explaining the application of the invention thereto.

Figure 6 shows how the bell-crank lever 14 may be locked in an inoperative position by a locking-device at the outer side of the second brake-drum 8 in such a manner that the arms cannot come into contact with the spokes of the wheel. In this position no brake-force can be automatically exerted as the member 14 is clear from engagement with the spokes.

The brake-device according to the invention may also be double acting as illustrated in Figure 7.

The connection 10—6 is designed for tension. The second brake-drum is now provided diametrically opposite with a second projecting horizontal stud 13 carrying a rotatable bell-crank lever 14. One of these levers or both may be brought and locked into inoperative position. In the brake-drum when a pulling action is exerted on the connection 10—6 the connection 20—6 will be slackened and vice versa. The slots in the second drum 8 are in this case provided also at the other side of the vertical axis while the brake-drum is always returned to its central position as the two connections with the spring-lever 5 have equal tension as soon as the action or the brake-device is finished.

Having now particularly described and ascertained the nature of my said invention and in what manner the same is to be performed, I declare that what I claim is:—

1. An automatic device for applying wheel brakes, comprising, mechanism for use with a wheel and its brake, the mechanism including, a drum mounted to remain stationary upon rotation of the wheel in one direction, detent means to cause the drum to rotate with the wheel upon rotation in the other direction, and connecting means between the drum and the brake arranged to apply the brake upon rotation of the drum, the detent means being a bell crank lever pivoted to the drum, one arm of the lever bearing against the wheel spokes and operating as a pawl therewith, whereby in one direction it permits passage of the wheel spokes, and in the other direction it is entrained by the wheel spokes.

2. An automatic device for applying wheel brakes, comprising, mechanism for use with a wheel and its brake, the mechanism including, a drum mounted to remain stationary upon rotation of the wheel in one direction, detent means to cause the drum to rotate with the wheel upon rotation in the other direction, and connecting means between the drum and the brake arranged to apply the brake upon rotation of the drum, the detent means being a bell crank lever pivoted to the drum, one arm of the lever bearing against the wheel spokes and operating as a pawl therewith, whereby in one direction it permits passage of the wheel spokes, and in the other direction it is entrained by the wheel spokes, the connecting means including a member interconnecting the drum and the operating means for the wheel brake.

3. An automatic device for applying wheel brakes, comprising, mechanism for use with a wheel and its brake, the mechanism including, a drum mounted to remain stationary upon rotation of the wheel in one direction, detent means to cause the drum to rotate with the wheel upon rotation in the other direction, and connecting means between the drum and the brake arranged to apply the brake upon rotation of the drum, the drum being mounted for limited rotary motion and positioned adjacent the drum of the wheel brake.

4. An automatic device for applying wheel brakes, comprising, mechanism for use with a wheel and its brake, the mechanism including, a drum mounted to remain stationary upon rotation of the wheel in one direction, detent means to cause the drum to rotate with the wheel upon rotation in the other direction, and connecting means between the drum and the brake arranged to apply the brake upon rotation of the drum, the detent means being a bell crank lever pivoted to the drum, one arm of the lever bearing against the wheel spokes and operating as a pawl therewith, whereby in one direction it permits passage of the wheel spokes, and in the other direction it is entrained by the wheel spokes, the drum being mounted for limited rotary motion and positioned adjacent the drum of the wheel brake.

5. A wheel brake applying means for use with a wheel and its brake, comprising, a drum mounted adjacent the drum of the brake, a cable connecting the drum and the operating lever of the brake and tensioned by rotation of the drum, a two armed pawl device pivoted to the drum and cooperating with the wheel spokes to prevent relative rotation of the drum and the wheel when the wheel rotates in one direction, and to permit relative rotation thereof when the wheel rotates in the other direction, and means limiting rotation of the drum in each direction.

In testimony whereof I affix my signature.

HENRI WOUTER JONKHOFF.